(12) United States Patent
Iwata et al.

(10) Patent No.: US 9,435,379 B2
(45) Date of Patent: Sep. 6, 2016

(54) BEARING DEVICE

(71) Applicant: JTEKT CORPORATION, Osaka-shi, Osaka (JP)

(72) Inventors: Takashi Iwata, Kitakatsuragi-gun (JP); Chiaki Saito, Chiryu (JP); Yoshitaka Waseda, Greer, SC (US)

(73) Assignee: JTEKT CORPORATION, Osaka (JP)

( * ) Notice: Subject to any disclaimer, the term of this patent is extended or adjusted under 35 U.S.C. 154(b) by 315 days.

(21) Appl. No.: 14/031,477

(22) Filed: Sep. 19, 2013

(65) Prior Publication Data

US 2014/0079572 A1 Mar. 20, 2014

(30) Foreign Application Priority Data

Sep. 20, 2012 (JP) ................................ 2012-206564

(51) Int. Cl.
| | |
|---|---|
| *F16C 33/60* | (2006.01) |
| *F16C 33/66* | (2006.01) |
| *F01D 25/16* | (2006.01) |
| *F16C 19/52* | (2006.01) |
| *F16C 35/077* | (2006.01) |
| *F16C 19/54* | (2006.01) |
| *F16C 19/16* | (2006.01) |

(52) U.S. Cl.
CPC ........... *F16C 33/6637* (2013.01); *F01D 25/16* (2013.01); *F16C 19/527* (2013.01); *F16C 19/548* (2013.01); *F16C 33/6674* (2013.01); *F16C 33/6681* (2013.01); *F16C 33/6685* (2013.01); *F16C 35/077* (2013.01); *F16C 19/163* (2013.01); *F16C 2360/24* (2013.01)

(58) Field of Classification Search
CPC F16C 19/527; F16C 19/548; F16C 33/6637; F16C 33/6674; F16C 33/6681; F16C 33/6685; F16C 35/077; F16C 35/12; F16C 2360/23; F16C 2360/24; F01D 25/16; F02C 7/06

See application file for complete search history.

(56) References Cited

U.S. PATENT DOCUMENTS

| 8,956,048 | B2* | 2/2015 | Schmidt ................ F16C 27/045 384/99 |
| 2008/0019629 | A1* | 1/2008 | McKeirnan ........... F16C 35/077 384/493 |
| 2011/0236193 | A1* | 9/2011 | Chriss .................. F16C 33/6659 384/467 |

FOREIGN PATENT DOCUMENTS

| DE | 20 2004 017 194 U1 | 3/2006 |
| GB | 935457 | 8/1963 |
| JP | S60-43137 U | 3/1985 |

(Continued)

OTHER PUBLICATIONS

Extended Search Report issued in European Patent Application No. 13184679.2 dated Feb. 6, 2014.

(Continued)

*Primary Examiner* — James Pilkington
(74) *Attorney, Agent, or Firm* — Oliff PLC

(57) ABSTRACT

A bearing device includes: an outer ring housing in a cylindrical shape which is provided in a casing and has a discharge hole in an axially central portion of the outer ring housing and a notch groove passing through an axial end surface of the outer ring housing in the radial direction; and a rolling bearing mounted on each of both axial sides of the outer ring housing and rotatably supporting a rotational shaft positioned radially inside of the outer ring housing.

7 Claims, 6 Drawing Sheets

(56) References Cited

FOREIGN PATENT DOCUMENTS

| JP | 2005-106108 A | 4/2005 |
|----|---------------|--------|
| JP | A-2010-133266 | 6/2010 |

OTHER PUBLICATIONS

May 24, 2016 Office Action issued in Japanese Application No. 2012-206564.

\* cited by examiner

BEARING DEVICE

INCORPORATION BY REFERENCE

The disclosure of Japanese Patent Application No. 2012-206564 filed on Sep. 20, 2012 including the specification, drawings and abstract is incorporated herein by reference in its entirety.

BACKGROUND OF THE INVENTION

1. Field of the Invention

The present invention relates to a bearing device used for a turbocharger, for example.

2. Description of Related Art

A bearing system for a turbocharger which supports a rotational shaft that rotates at a high speed in a casing has been known, as shown in FIG. 6, which includes an cylindrical outer ring housing 91 provided in a casing 90, and rolling bearings 92, 92 mounted on respective axial sides of the outer ring housing 91 and in which the rolling bearings 92, 92 rotatably support a rotational shaft 99 positioned radially inside of the outer ring housing 91 (see Japanese Patent Application Publication No. 2010-133266 (JP 2010-133266 A)).

In the turbocharger shown in FIG. 6, an oil supply hole 96 is provided in the casing 90, and oil is supplied from the oil supply hole 96 to an outer peripheral surface 91a of the outer ring housing 91. This oil forms an oil film between an inner peripheral surface 90a of the casing 90 and the outer peripheral surface 91 a of the outer ring housing 91. Vibrations of a bearing device 97 can thus be hindered from being transmitted to the casing 90.

Further, the oil supplied to a portion between the inner peripheral surface 90a of the casing 90 and the outer peripheral surface 91a of the outer ring housing 91 is supplied into the rolling bearings 92 via portions between axial end surfaces 98 of the outer ring housing 91 and side wall surfaces 90b in the casing 90. This oil enables lubrication and cooling of the rolling bearings 92.

SUMMARY OF THE INVENTION

As described above, the oil supplied from the casing 90 side of the turbocharger functions to lubricate the rolling bearings 92 and also to cool them. However, in a case where oil in an amount more than required for the lubrication and cooling is supplied into the rolling bearings 92, oil passing over the rolling bearings 92 stays in an annular space 100 between a spacer 99a mounted on an outer peripheral side of the rotational shaft 99 and the outer ring housing 91, resulting in increased stirring resistance of oil in the rolling bearings 92 that rotate at a high speed. Consequently, rotational resistance of the rotational shaft 99 increases, and the turbocharger may not be able to provide its sufficient function.

A discharge hole 89 for discharging oil is formed in an axially central portion of the outer ring housing 91, and excessive oil in the annular space 100 formed in a portion between the rolling bearings 92, 92 on both the axial sides can be discharged outside the bearing device 97 through the discharge hole 89. However, when a discharge amount is not sufficient compared to a supply amount of oil, oil stays in the annular space 100, thus increasing the stirring resistance of oil in the rolling bearings 92.

Accordingly, the present invention provides a bearing device which enables supply of a restricted amount of oil into the bearing device.

An aspect of the present invention provides a bearing device including: an outer ring housing in a cylindrical shape which is provided in a casing and has a discharge hole in an axially central portion of the outer ring housing and a notch groove passing through an axial end surface of the outer ring housing in the radial direction; and a rolling bearing mounted on each of both axial sides of the outer ring housing and rotatably supporting a rotational shaft positioned radially inside of the outer ring housing. In the aspect, oil supplied to a portion between an inner peripheral surface of the casing and an outer peripheral surface of the outer ring housing may be supplied into the rolling bearing via a portion between the axial end surface of the outer ring housing and a side wall surface of the casing, the oil passing through the rolling bearing may be discharged from an annular space defined between the rolling bearings on both the axial sides of the outer ring housing through the discharge hole.

According to the aspect, when the oil supplied to the portion between the inner peripheral surface of the casing and the outer peripheral surface of the otter ring housing is supplied into the rolling bearing via the portion between the axial end surface of the outer ring housing and the side wall surface in the casing, the axial end surface of the outer ring housing has the notched groove formed therein to pass through the end surface in the radial direction, and oil is thereby supplied from the notch groove toward the tolling bearing. Further, at the end surface, a supply amount of oil is restricted by the notch groove, thereby allowing prevention of supply of excessive oil into the roiling bearing.

In the aspect, the axial end surface of the outer ring housing may be positioned axially outside an axially outer side surface of an outer ring included in the rolling bearing, and a groove bottom surface of the notch groove may be positioned axially outside the axially outer side surface of the outer ring. In such a case, the depth of the notch groove is set shallow, thereby allowing restriction of an oil amount supplied to the rolling bearing.

Further, in the aspect, the bearing device may include a space between an imaginary plane in which the groove bottom surface of the notch groove is expanded and the axially outer side surface of the outer ring included in the rolling bearing. In such a case, the all flowing along the groove bottom surface of the notch groove is Less likely to further flow along the axially outer side surface of the outer ring to be supplied into the rolling bearing, thereby allowing restriction of the oil amount supplied to the rolling bearing.

Further, in the aspect, a turbocharger includes: the rotational shaft; a turbine provided at an end on one side of the rotational shaft and rotated by exhaust gas flowing through an exhaust path; an impeller provided at an end on the other side of the rotational shaft and compressing air drawn from a boost air path; and the bearing device. The notch groove may be provided only in the end surface adjoining the turbine between the end surfaces on both the axial sides of the outer ring housing. In the turbocharger, because the rolling bearing on the turbine side is subject to a temperature higher than the rolling bearing on the impeller side, the rolling bearing adjoining the turbine requires oil supply in an appropriate oil amount. Accordingly, the notch groove is provided in the end surface adjoining the turbine between the end surfaces on both the axial sides of the outer ring housing, thereby allowing such oil supply. Meanwhile, the notch groove is not formed in the end surface adjoining the impeller, thereby reducing man-hours for manufacturing the bearing device (for processing the outer ring housing).

In the aspect, the end surface of the outer ring housing may have an annular shape, and the notch groove may be provided in a portion of an upper half area of the end surface. Further, the notch groove may be provided in an upper end position of the end surface of the outer ring housing. Moreover, the end surface of the outer ring housing may have an annular shape, and a notch groove other than the notch groove may be provided in a portion of a lower half area of the end surface. Further, the other notch groove may be provided in a lower end position of the end surface of the outer ring housing.

In addition, in an above configuration, a bottom surface of the other notch groove and the axially outer side surface of the outer ring may be in a same axial position. In other words, because they form continuous surfaces that are present in the same plane, the oil that is not provided into the rolling bearing flows from the side surface of the outer ring along the groove bottom surface of the other notch groove and can thereby easily flows in the other notch groove. Therefore, such oil can be discharged toward the outer peripheral surface of the outer ring housing.

Moreover, in the configuration, a groove cross-sectional area of the notch groove may be smaller than a groove cross-sectional area of the other notch groove. The notch groove restricts the supply amount of oil, and the oil that is not provided into the rolling bearing can easily flow in the other notch groove. Therefore, such oil can be discharged toward the outer peripheral surface of the outer ring housing.

According to the aspect, the supply amount of oil is restricted by the notch grooves formed on the axial end surface of the outer ring housing, thereby allowing prevention of supply of excessive oil into the rolling bearing. As a result, oil can be prevented from staying in the annular space, and the stirring resistance of oil in the rolling bearing can be prevented from increasing, thereby allowing enhancement of rotation performance of the rotational shaft.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

Figure 3:
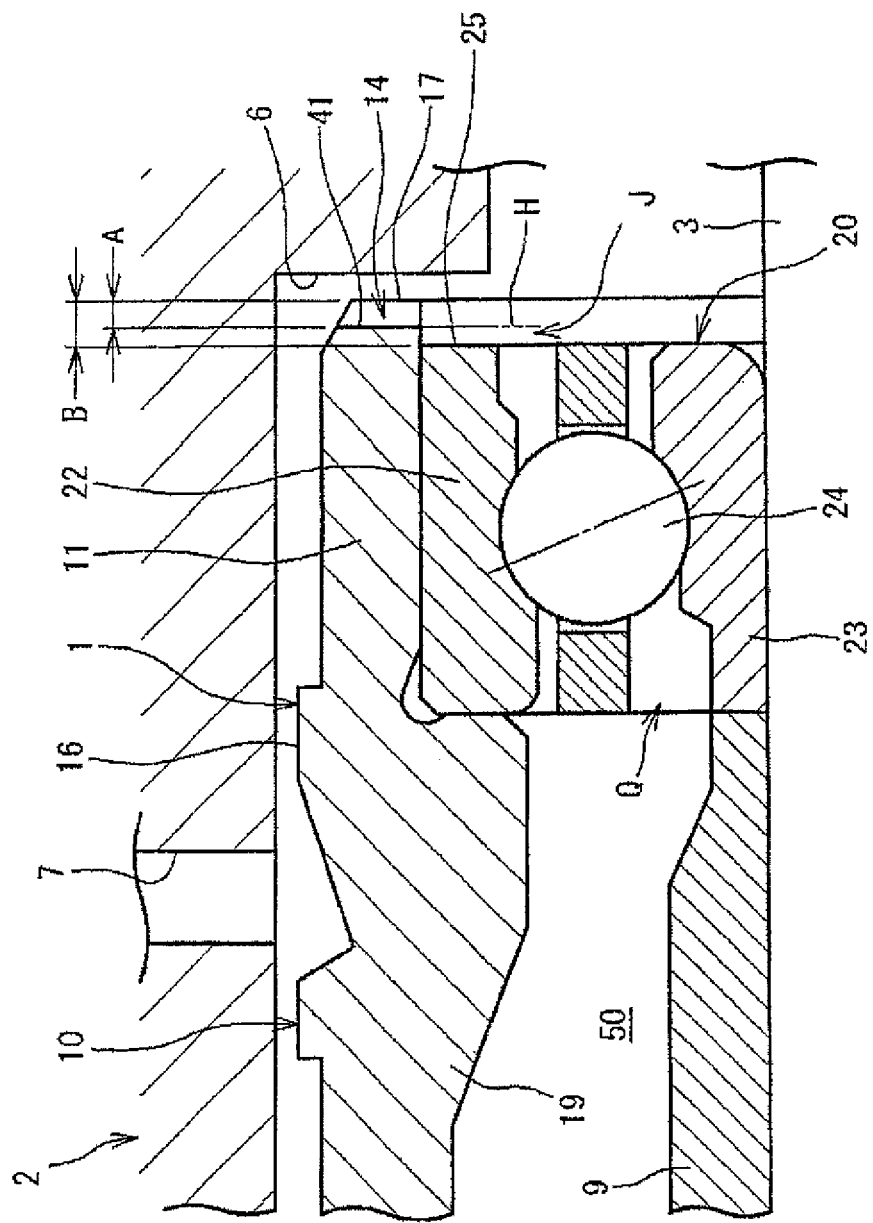
Figure 4:
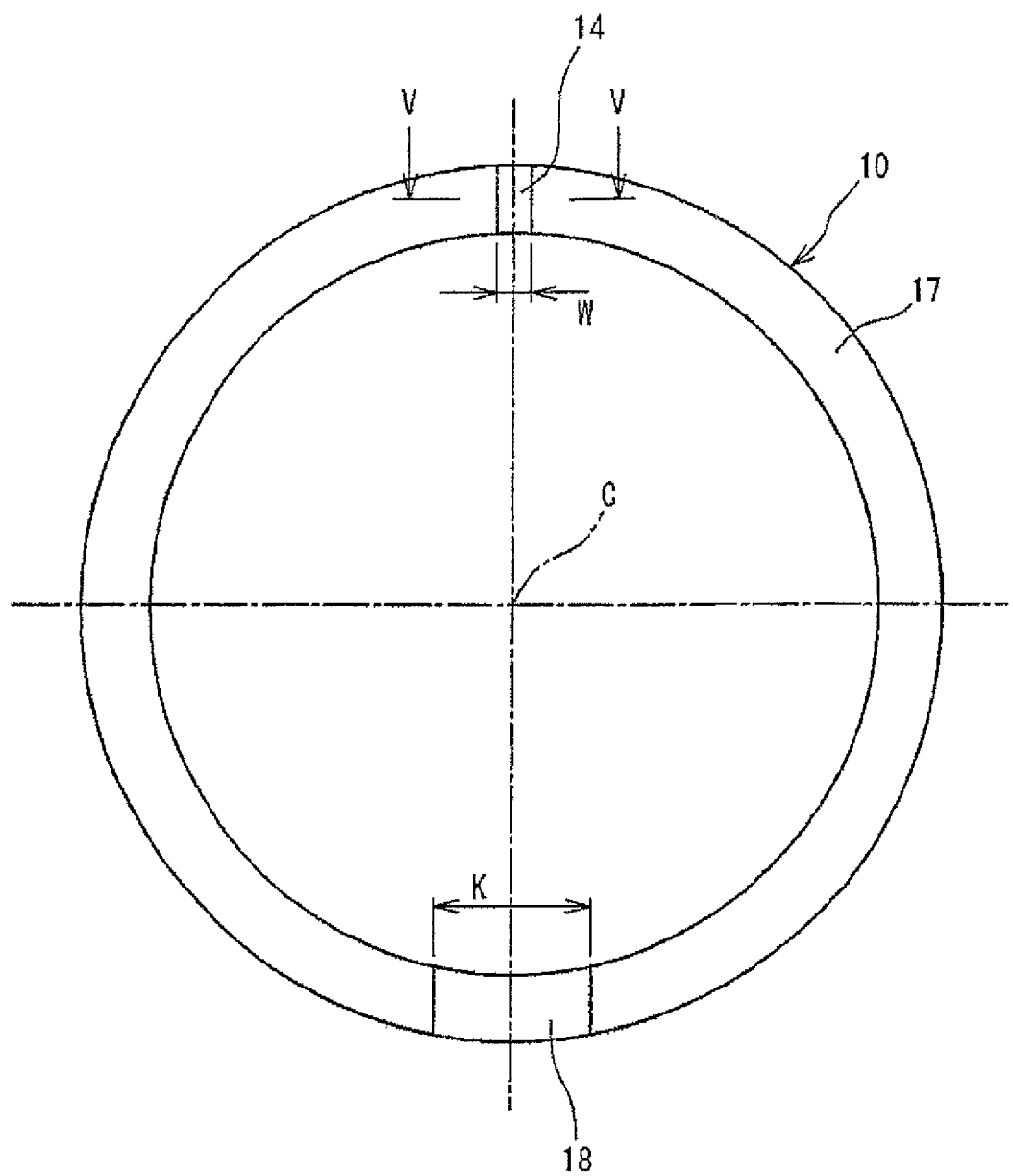
Figure 5:
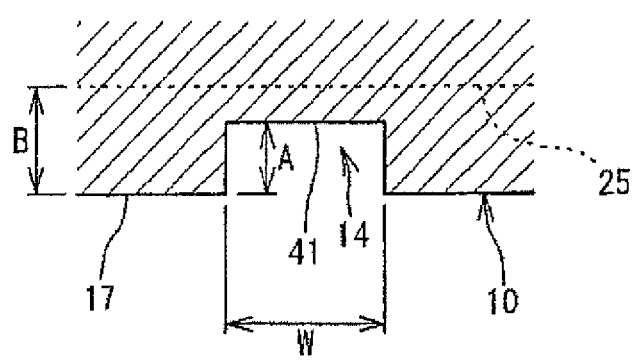
Figure 6:
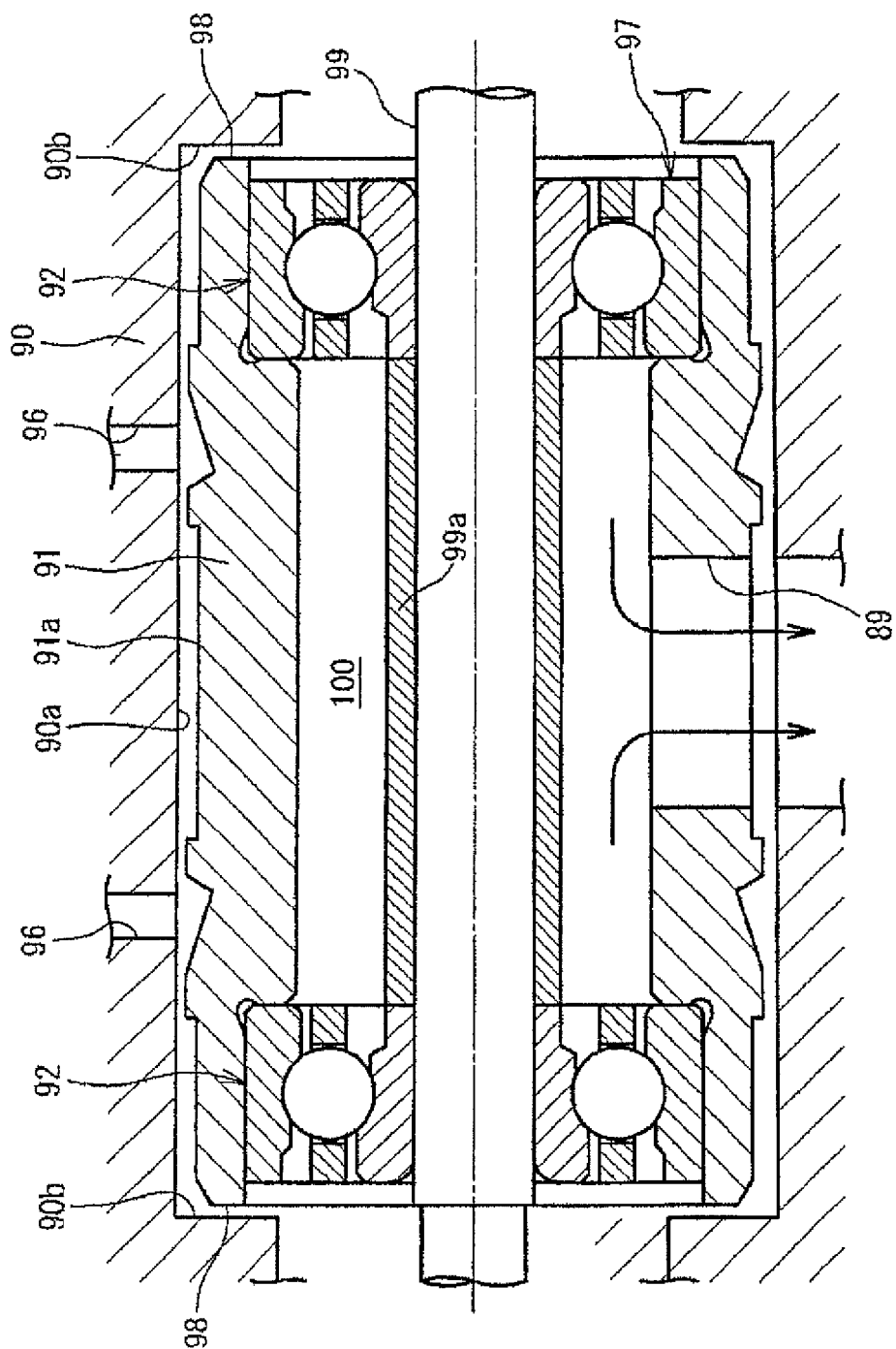

FIG, 2 is a cross-sectional view of the bearing device;

FIG. 3 is an enlarged cross-sectional view of a casing and the bearing device in a portion on one side in an axial direction;

FIG. 4 is a side view of the outer ring housing as seen from one side in the axial direction;

FIG. 5 is a cross-sectional view as seen in the direction of arrows V-V of FIG. 4; and FIG. 6 is a cross-sectional view of the bearing device of a related art.

DETAILED DESCRIPTION OF EMBODIMENTS

Figure 1:
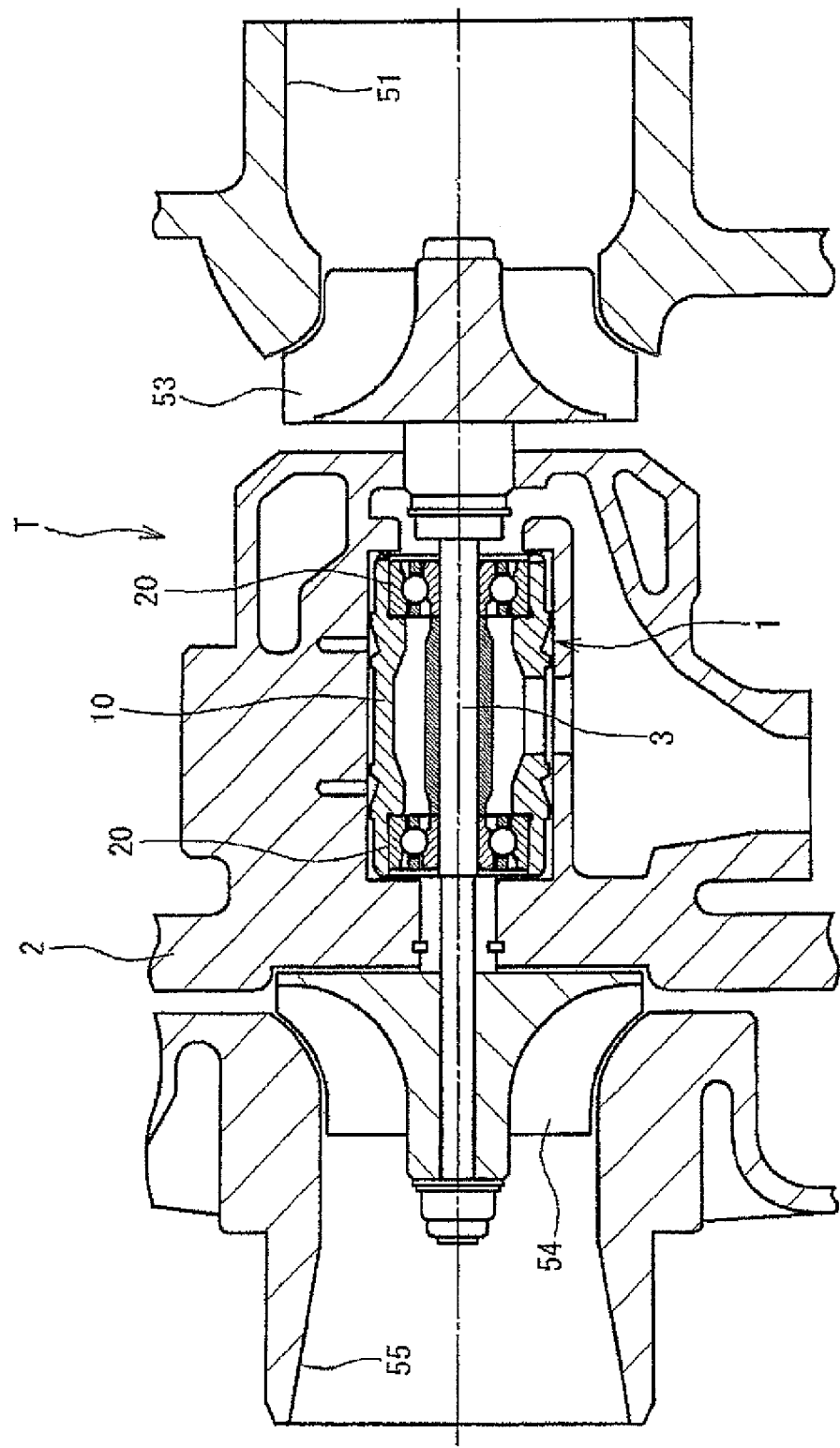
FIG. 1 is a vertical cross-sectional view of a turbocharger having a bearing device of the present invention installed therein.

An embodiment of the, present invention will be described hereinafter with reference to drawings. FIG. 1 is a vertical cross-sectional view of a turbocharger T having a bearing device 1 of the present invention installed therein. The turbocharger T includes a casing 2 and a rotational shaft 3 which rotates at a high speed in the casing 2. The rotational shaft 3 has a turbine 53 provided at an end on one axial side (right side in FIG. 1) and an impeller 54 provided at the other end on the other axial side (left side in FIG. 1).

An exhaust path 51 is provided on one axial side of the casing 2, and a boost air path 55 is provided on the other axial side. The turbine 53 is rotated by exhaust gas flowing through the exhaust path 51, and the rotational shaft 3 thereby rotates at a high speed. Rotational force of the rotational shaft 3 rotates the impeller 54 in the boost air path 55, The impeller 54 compresses the air drawn in through an opening of the boost air path 55. The compressed air is delivered into a cylinder chamber of an engine which is not shown together with fuel such as gasoline or diesel fuel.

The rotational shaft 3 of such a turbocharger T rotates at a high speed of several ten thousands to several hundred thousands (revolutions/minute), and the rotational speed frequently varies in response to the operational state (number of revolutions) of the engine; therefore, it is preferable that rotational loss of the rotational shaft 3 be reduced as much as possible. Accordingly, the bearing device 1 provided in the casing 2 supports the rotational shaft 3 so that the rotational shaft 3 is subject to low rotational resistance.

Figure 2:
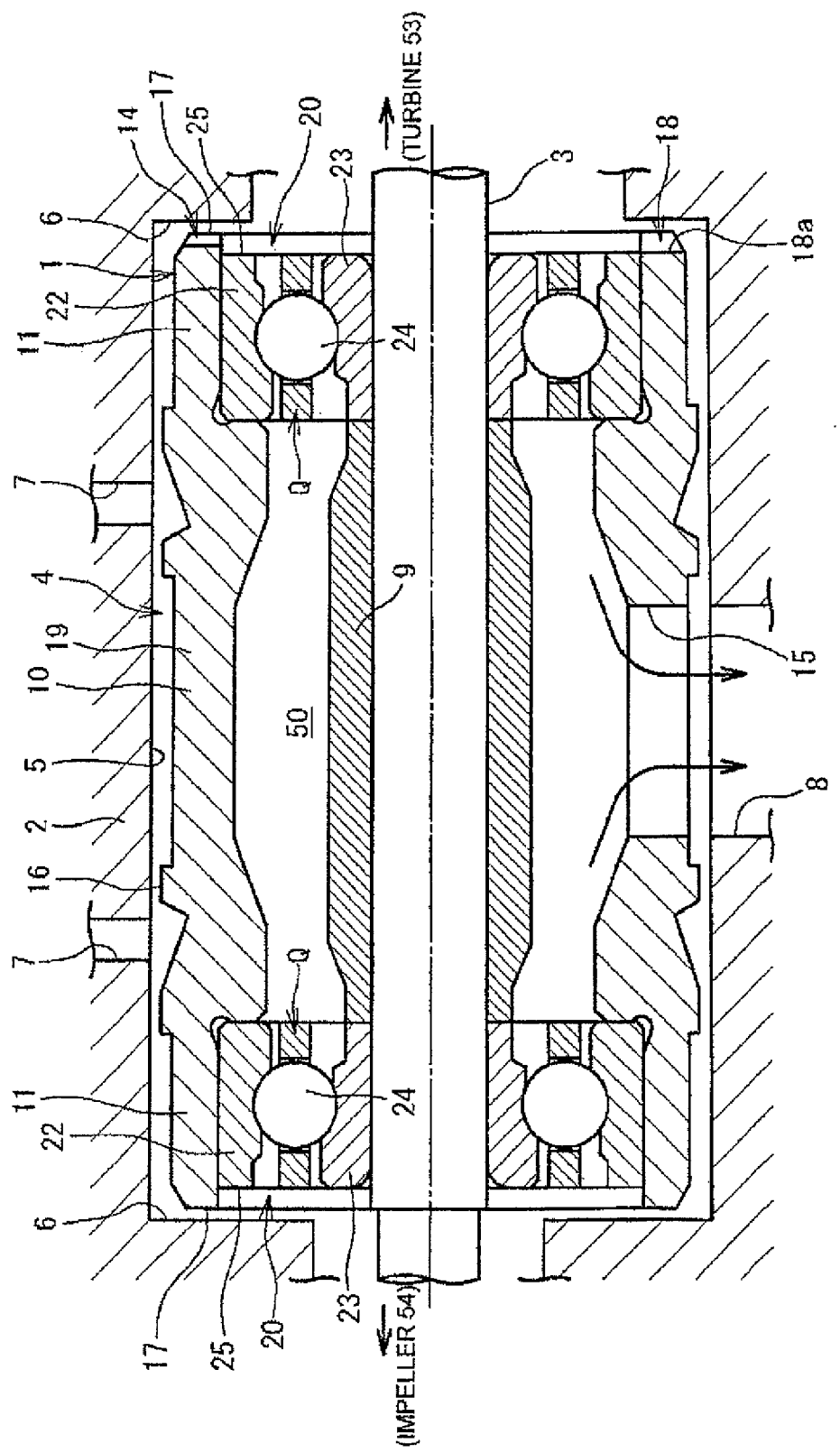

FIG. 2 is a cross-sectional view of the bearing device 1. The bearing device 1 includes an outer ring housing 10 that is provided in the casing 2 and has a cylindrical shape and the rolling bearings 20, 20 mounted on respective axial sides 11, 11 of the outer ring housing 10. The rolling bearings 20, 20 rotatably support the rotational shaft 3 positioned radially inside of the outer ring housing 10.

In the casing 2 of the turbocharger T, a housing chamber 4 for housing the bearing device 1 is formed at a central-portion. In other words, in the casing 2, an inner peripheral surface 5, and annular side wall surfaces 6, 6 that respectively extend in the radial direction from both axial sides of the inner peripheral surface 5 are formed. An area surrounded by the inner peripheral surface 5 and the side wall surfaces 6, 6 is the housing chamber 4.

Further, in the casing 2, oil supply holes 7, 7 opening in the inner peripheral surface 5 and an oil outlet hole 8 are formed. The oil supply holes 7 are formed in upper portions of the casing 2. Oil (lubricating oil) is supplied to a portion between an outer peripheral surface 16 of the outer ring housing 10 and the inner peripheral surface 5 of the casing 2 through the oil supply holes 7. The oil outlet hole 8 is formed in a lower portion of the casing 2, The oil passing through the bearing device 1 provided in the housing chamber 4 is discharged outside through the oil outlet hole 8.

The outer ring housing 10 is a cylindrical member which includes both the axial sides 11, 11 that have cylindrical shapes and a main body 19 positioned between the axial sides and in which those are integrally formed. Further, a discharge hole 15 of oil is formed in a portion (lower portion) in an axially central portion of the outer ring housing 10. The discharge hole 15 is arranged to communicate with the oil outlet hole 8 of the casing 2. The axial dimension of the outer ring housing 10 is slightly smaller than the axial dimension between the side wall surfaces 6, 6 of the casing 2. Rotation of the outer ring housing 10 in the circumferential direction is restricted in the casing 2. However, the outer ring housing 10 is moveable in a very small dimension toward one axial side and the other axial side.

Further, end surfaces 17, 17 on both axial sides of the outer ring housing 10 are facing surfaces that at gaps face the side wall surfaces 6, 6 provided on both the axial sides in the casing 2. A very small gap is formed between the axial end surface 17 of the outer ring housing 10 and the side wall surface 6 of the casing 2. However, the gap is drawn larger in FIG. 2 for convenience of description.

Further, when the outer ring housing 10 moves toward one axial side (right side in FIG. 2) in the casing 2, the end surface 17 on the one axial side of the outer ring housing 10 may contact with the side wall surface 6 (the side wall surface 6 on the right side in FIG. 2) in the casing 2 in the axial direction. The end surface 17 is positioned axially outside (right side in FIG. 2) an axially outer side surface 25 of an outer ring 22 included in the roiling bearing 20. Further, in the same way as this, when the outer ring housing 10 moves toward the other axial side (left side in FIG. 2) in the easing 2, the end surface 17 on the other axial side of the outer ring housing 10 may contact with the side wall surface 6 (the side wall surface 6 on the left side in FIG. 2) in the axial direction. The end surface 17 is positioned axially outside (left side in FIG. 2) the axially outer side surface 25 of the outer ring 22.

The rolling bearings 20, 20 on both the axial sides have the same structure. The rolling bearing 20 of this embodiment is an angular contact ball bearing. Each of the rolling bearings 20 has the outer ring 22, an inner ring 23, and a ball 24 as a rolling element. The ball 24 is made of ceramics. The outer rings 22 are fitted into both the respective axial sides 11, 11 of the outer ring housing 10. The inner ring 23 externally fits the rotational shaft 3, A cylindrical spacer 9 is provided between the inner rings 23 on both the axial sides. The rotational shaft 3 passes through the spacer 9. The spacer 9 positions the left and right inner rings 23, 23 in the axial direction. Further, an annular space 50 is formed between the outer ring housing 10 and the spacer 9 (the rotational shaft 3) and between the rolling bearings 20, 20 on both the axial sides.

In addition, in this embodiment, an oil film is formed with the oil supplied from the oil supply holes 7, 7 between the inner peripheral surface 5 of the casing 2 and the outer peripheral surface 16 of the outer ring housing 10. Vibrations of the bearing device 1 can thus be hindered from being transmitted to the casing 2. The oil supplied to the portion between the inner peripheral surface 5 and the outer peripheral surface 16 is supplied into the rolling bearing 20 through a portion between the axial end surface 17 of the outer ring housing 10 and the side wall surface 6 in the casing 2 on each of both the axial sides. In other words, oil is supplied to annular bearing spaces Q between the outer rings 22 and the respective inner rings 23. The oil passing through the rolling bearings 20, 20 (the oil passing through the bearing spaces Q) flows through the annular space 50 and is discharged from the annular space 50 to the outside through the discharge hole 15 and the oil outlet hole 8.

FIG. 3 is an enlarged cross-sectional view of the casing 2 and the bearing device 1 in a portion on one side (right side in FIG. 2) in the axial direction. The one axial side corresponds to the turbine 53 side in the turbocharger T shown in FIG. 1. FIG. 4 is a side view of the outer ring housing 10 as seen from one axial side (the turbine 53 side). FIG. 5 is a cross-sectional view as seen in the direction of arrows V-V of FIG. 4.

A notch groove 14 is formed in one of the end surfaces 17, 17 of both the axial sides of the outer ring housing 10. In this embodiment, the end surface 17 in which the notch groove 14 is formed is the end surface 17 on the turbine 53 side (see FIG. 1). The cross-sectional shape of the notch groove 14 is rectangular as shown in FIG. 5 but may have another shape. The notch groove 14 passes through an axial end of the outer ring housing 10 in the radial direction and serves as a flow path of the oil supplied to the portion between the outer peripheral surface 16 of the outer ring housing 10 and the inner peripheral surface 5 of the casing 2.

The notch groove 14 allows the oil supplied toward the outer peripheral surface 16 of the outer ring housing 10 to be supplied to the rolling bearing 20 side on the one axial side (the turbine 53 side in FIG. 1). For example, even when the outer ring housing 10 moves toward one axial side (the turbine 53 side in FIG. 1) in the casing 2 and the end surface 17 on the one axial side of the outer ring housing 10 approaches the side wall surface 6 in the casing 2 and further contacts therewith, the notch groove 14 that passes through the end surface 17 in the radial direction is formed in the end surface 17, and oil is thereby supplied from the notch groove 14 into the rolling bearing 20.

Further, a second notch groove 18 is also formed in the end surface 17 in which the notch groove 14 is formed (see FIGS. 2 and 4). The second notch groove 18 has a rectangular cross section similarly to the first notch groove 14. The second notch groove 18 passes through the axial end of the outer ring housing 10 in the radial direction and serves as a flow path of oil. The second notch groove 18 allows the oil which has passed through the first notch groove 14 but has not flowed into the bearing 20 to flow toward the outer peripheral surface 16 of the outer ring housing 10 and thereby to be discharged from the oil outlet hole 8 to the outside.

As shown in FIG. 4, the first notch groove 14 is formed in a portion of an upper half area of the annular end surface 17 of the outer ring housing 10. The second notch groove 18 is formed in a portion of a lower half area of the annular end surface 17 of the outer ring housing 10. Particularly, the fast notch groove 14 is formed in an upper end position of the end surface 17. The second notch groove 18 is formed in a lower end position of the end surface 17. In this embodiment, the single first notch groove 14 is formed in the end surface 17. The single second notch groove 18 is formed in the end surface 17. The first notch groove 14 and the second notch groove 18 are provided 180° apart from each other with a center line C of the outer ring housing 10 being the center.

As shown in FIG. 3, the end surface 17 in which the notch grooves 14, 18 are formed is positioned axially outside (right side in FIG. 3) the axially outer side surface 25 of the outer ring 22. In other words, the axial end of the outer ring housing 10 protrudes axially outside (right side in FIG. 3) the side surface 25 of the outer ring 22. In this embodiment, the depth (groove depth A) of a groove cross section of the first notch groove 14 is set smaller than an axial dimension B from the end surface 17 in which the notch groove 14 is formed to the axially outer side surface 25 of the outer ring 22 (A<B). In other words, the axial position of a groove bottom surface 41 of the first notch groove 14 is positioned between the axially outer side surface 25 of the outer ring 22 and the axial end surface 17 of the outer ring housing 10.

Further, the axial position of a groove bottom surface 18a (see FIG. 2) of the second notch groove 18 is the same as the axially outer side surface 25 of the outer ring 22. However, as shown in FIG. 3, the groove bottom surface 41 of the first notch groove 14 is positioned axially outside (right side in FIG. 3) the axially outer side surface 25 of the outer ring 22. Accordingly, the groove depth (dimension A in FIG. 5) of the first notch groove 14 is different from the groove depth of the second notch groove 18.

Moreover, the groove widths (dimension W in FIG. 5) are different between the first notch groove 14 and the second notch groove 18. In other words, as shown in FIG. 4, the groove width (dimension W) of the first notch groove 14 is set smaller than the groove width (dimension K) of the second notch groove 18 (W<K), According to above features, the groove cross-sectional area of the first notch groove 14 for allowing oil to flow from the outer peripheral surface 16 side of the outer ring housing 10 to the rolling bearing 20 side is set smaller than the groove cross-sectional area of the second notch groove 18 for allowing oil to flow from the rolling bearing 20 side to the outer peripheral surface 16 side of the outer ring housing 10.

Accordingly, even when the end surface 17 of the outer ring housing 10 approaches the side wall surface 6 in the casing 2 and further contacts therewith, the first notch groove 14 that passes through the end surface 17 in the radial direction is formed in the end surface 17, and oil is thereby supplied from the first notch groove 14 into the rolling bearing 20. In addition, at the end surface 17, the first notch groove 14 restricts a supply amount of oil. Particularly, as described above, because the groove bottom surface 41 of the first notch groove 14 is positioned axially outside (right side in FIG. 3) the axially outer side surface 25 of the outer ring 22, the groove depth A of the notch groove 14 is set shallow, thereby allowing restriction of an oil amount supplied into the rolling bearing 20.

This allows prevention of excessive oil supply into the rolling bearing 20 and further allows prevention of oil flow to the annular space 50 through the rolling bearing 20. In other words, the first notch groove can have a function of an oil "restrictor".

The function according to the configuration of the notch groove 14 will further be described. As shown in FIG. 3, a space J is formed between an imaginary plane H where the groove bottom surface 41 of the notch groove 14 is expanded inward in the radial direction and the side surface 25 of the outer ring 22. In other words, the groove bottom surface 41 and the side surface 25 form discontinuous surfaces (stepped surfaces) whose positions in the axial direction are different. Accordingly, the oil flowing along the groove bottom surface 41 of the notch groove 14 is less likely to further flow along the side surface 25 of the outer ring 22 to be supplied into the rolling bearing 20 (the bearing space Q between the outer ring 22 and the inner ring 23), thereby allowing restriction of the oil amount supplied to the rolling bearing 20.

In contrast, as described above, because the groove bottom surface 18a (see FIG. 2) of the second notch groove 18 and the axially outer side surface 25 of the outer ring 22 are in the same axial position, in other words, they form continuous surfaces that are present on the same plane, the oil which is not supplied into the rolling beating 20 flows from the side surface 25 of the outer ring 22 along the groove bottom surface 18a of the second notch groove 18 and can thereby easily flows in the notch groove 18. Therefore, such oil can be discharged toward the outer peripheral surface 16 of the outer ring housing 10 and can further be discharged to the outside through the oil outlet hole 8.

As described above, the bearing device 1 in accordance with this embodiment can prevent supply of excessive oil into the rolling bearing 20, prevent the oil passing through the rolling bearing 20 from staying in the annular space 50, and prevent the stirring resistance of the oil in the rolling bearing 20 from increasing. This allows prevention of an increase in the rotational resistance of the rotational shaft 3 and allows the turbocharger to sufficiently function.

Further, as shown in FIG. 1, the bearing device 1 in accordance with this embodiment is a bearing device for the turbocharger T. In the turbocharger T, because the rolling bearing 20 on the turbine 53 side is subject to a higher temperature than the rolling bearing 20 on the impeller 54 side, the rolling bearing 20 adjoining the turbine 53 requires oil supply in an appropriate oil amount. Accordingly, the notch groove 14 is formed only in the end surface 17 adjoining the turbine 53 between the end surfaces 17, 17 (see FIG. 2) on both the axial sides of the outer ring housing 10. This allows oil supply in an appropriate amount to the rolling bearing 20 adjoining the turbine 53. On the other hand, the notch groove 14 (18) is not formed in the end surface 17 adjoining the impeller 54. This allows reduction in man-hours for manufacturing the bearing device 1 (for processing the outer ring housing 10) and allows contribution to cost reduction.

The bearing device of the present invention is not limited to the mode shown in the drawings but may be carried out in other modes within the scope of the present invention. For example, in the above-described embodiment, descriptions are made about a case where the notch groove 14 is formed only in the end surface 17 on one axial side (the turbine 53 side) of the outer ring housing 10. However, the present invention is not limited to this. Although not shown, the notch groove 14 may be formed only in the end surface 17 on the other axial side (the impeller 54 side). Alternatively, the notch groove 14 may be formed on each of the end surfaces 17, 17 on both of the axial sides. In the above-described embodiment, the single first notch groove 14 is formed in the single end surface 17. However, a plurality of notch grooves 14 may be formed in the single end surface 17 at intervals in the circumferential direction. Moreover, a plurality of second notch grooves 18 may be formed in the same way.

What is claimed is:

1. A bearing device comprising:
   an outer ring housing in a cylindrical shape which is provided in a casing and has a discharge hole in an axially central portion of the outer ring housing and a notch groove passing through an axial end surface of the outer ring housing in a radial direction; and
   each axial end of the outer ring housing configured with a rolling bearing mounted thereon and configured to rotatably support a rotational shaft positioned radially inside of the outer ring housing,
   wherein oil supplied to a portion between an inner peripheral surface of the casing and an outer peripheral surface of the outer ring housing is supplied into each rolling bearing via a portion between the axial end surface of the outer ring housing and a side wall surface of the casing, the oil passing through each rolling bearing is discharged from an annular space defined between the rolling bearings in both the axial ends of the outer ring housing through the discharge hole, wherein
   the end surface of the outer ring housing has an annular shape, and the notch groove is provided in a portion of an upper half area of the end surface,
   an additional notch groove other than the notch groove is provided in a portion of a lower haft area of the end surface, and
   a groove cross-sectional area of the notch groove is smaller than a groove cross-sectional area of the additional notch groove.

2. The bearing device according to claim 1,
   wherein the axial end surface of the outer ring housing is positioned axially outside an axially outer side surface of an outer ring included in the rolling bearing, and a groove bottom surface of the notch groove is positioned axially outside the axially outer side surface of the outer ring.

3. The bearing device according to claim 2,
wherein the bearing device includes a space between the groove bottom surface and the axially outer side surface of the outer ring included in the roiling bearing.

4. The bearing device according to claim 1,
wherein the notch groove is provided at an uppermost position of the end surface of the outer ring housing.

5. The bearing device according to claim 1,
wherein the additional notch groove is provided in a lowermost position of the end surface of the outer ring housing.

6. The bearing device according to claim 1,
wherein a groove bottom surface of the additional notch groove and an axially outer side surface of the outer ring are in a same axial position.

7. A turbocharger comprising:
a rotational shaft;
a turbine provided at an end on one side of the rotational shaft and rotated by exhaust gas flowing through an exhaust path;
an impeller provided at an end on the other side of the rotational shaft and compressing air drawn from a boost air path; and
a bearing device according to claim 1, wherein the notch groove is provided only in the end surface adjoining the turbine.

\* \* \* \* \*

UNITED STATES PATENT AND TRADEMARK OFFICE
CERTIFICATE OF CORRECTION

PATENT NO. : 9,435,379 B2
APPLICATION NO. : 14/031477
DATED : September 6, 2016
INVENTOR(S) : Takashi Iwata et al.

It is certified that error appears in the above-identified patent and that said Letters Patent is hereby corrected as shown below:

(72) Inventors should read:
Takashi IWATA, Kitakatsuragi-gun (JP);
Chiaki SAITO, Chiryu (JP);
Yoshitaka WASEDA, Greer, SC (US);
Masayuki TANADA, Toyota-shi (JP)

Signed and Sealed this
Tenth Day of July, 2018

Andrei Iancu
*Director of the United States Patent and Trademark Office*